United States Patent [19]

Bridson et al.

[11] Patent Number: 4,555,620

[45] Date of Patent: Nov. 26, 1985

[54] AUTOMATIC ILLUMINATION CONTROL FOR MULTI-OBJECTIVE OPTICAL INSTRUMENTS SUCH AS MICROSCOPES

[75] Inventors: William D. Bridson, Ontario; Edward N. Esmay, Webster, both of N.Y.

[73] Assignee: Bausch & Lomb Incorporated, Rochester, N.Y.

[21] Appl. No.: 457,301

[22] Filed: Jan. 11, 1983

[51] Int. Cl.⁴ .............................................. G01J 1/32
[52] U.S. Cl. ...................................... 250/205; 350/526
[58] Field of Search ............ 250/201, 205, 216, 214 P; 350/523–528

[56] References Cited

U.S. PATENT DOCUMENTS

| | | | |
|---|---|---|---|
| 4,163,150 | 7/1979 | Stankewitz | 250/201 |
| 4,241,251 | 12/1980 | Yonekubo | 250/205 |
| 4,384,200 | 5/1983 | Taira | 350/526 |

*Primary Examiner*—David C. Nelms
*Attorney, Agent, or Firm*—Bernard D. Bogdon; John S. Norton

[57] ABSTRACT

A multi-objective optical instrument, such as a microscope, has a photocell disposed in the optical path so as to effectively detect the intensity of light being transmitted by an illuminator to a receptor plane, such as defined by an operator's eyes. The light detected by the photocell is compared against a preset level of light. The intensity of the illumination would be adjusted automatically to a minimum level when the carrier is rotated and to a preselected level when an objective is in place for viewing. An electrical switch is cooperatively mounted to the rotatable objective carrier and detects rotation of the carrier to control the flow of current to the illuminator.

7 Claims, 3 Drawing Figures

AUTOMATIC ILLUMINATION CONTROL FOR MULTI-OBJECTIVE OPTICAL INSTRUMENTS SUCH AS MICROSCOPES

CROSS-REFERENCE TO RELATED APPLICATION

This application is related to simultaneously filed and copending application Ser. No. 457,300 of W. Bridson entitled "Illumination Control Apparatus for Optical Instruments", now abandoned and to application Ser. No. 448,142, entitled "Indexing Mechanism for Rotatable Nosepiece of a Microscope" filed on Dec. 9, 1982, for inventor, Henry J. Emmel and issued Nov. 20, 1984 as U.S. Pat. No. 4,483,589.

BACKGROUND OF THE INVENTION

1. Field of the Invention

The present invention is directed toward an apparatus for automatically monitoring and controlling the light emitted by an illuminator for a multi-objective optical instrument, such as a microscope.

2. Description of the Prior Art

Early optical instruments, such as microscopes, were basically very simple devices and, as such, only required existing light to illuminate the objects being viewed. However, as microscopes became more sophisticated and capable of higher and higher powers of magnification, it was necessary to provide a separate light source to sufficiently illuminate the specimen. A simple incandescent light with an on/off switch provided a solution for a period of time. However, the incandescent light was designed to give off a constant level of light. Therefore, it would not emit sufficient light in some instances, while producing too much light in others. As a result, some operators suffered from eye fatigue.

In order to overcome this situation, a rheostat was added which enabled each operator to individually control the level of light.

This system worked fairly successfully, but did suffer from a drawback when multi-objective rotatable nosepiece assemblies were introduced. Each objective mounted to the nosepiece shell required, generally, that the light be adjusted to accommodate for aperture size. Consequently, the operator was continually adjusting the level of light each time the power of objective was changed. Further, as slides were changed from one to another, the light requirement would also change. For instance, going from a transparent slide to a translucent slide would require more light from the illuminator. Accordingly, in addition to compensating for the objective power in place, the operator was also continually adjusting the rheostat to adjust for the transparency of the slide being viewed.

U.S. Pat. No. 4,241,251, issued Dec. 23, 1980, to K. Yonekubo, shows a microscope which utilizes an automatic switching system for controlling the light. A series of screws of various lengths are situated such that when detected by a microswitch, the illuminating light is adjusted relative to the power of the objective in place. This system has several inherent problems. It is necessary to insure that each screw is set to the exact and proper height. Further, a plurality of microswitches are necessary which must be located and accurately mounted to the instrument. These switches serve only to additionally complicate the instrument. Still further, and most importantly, this system only detects the objective which is in place. It does not detect that light which is reaching the observer. Consequently, the light requirements may not be fully met relative to the type of slide specimen being viewed.

In a second embodiment of the Yonekubo patent, a light emitting diode is arranged in a microscope so that light emitted from the diode reflects off a chamfered surface of an objective. Each objective would have a different chamfer. Light receiving elements are arranged in varying positions and detect light reflected off the chamfered surface of the objective. The illumination may be controlled based on the information received. This embodiment necessitates that the chamfered surfaces on the objective be held to fairly close tolerances. Also, a plurality of light receiving elements must be used to receive the information from the light emitting diode. Consequently, the cost and complexity of the instrument increase. This embodiment, similar to the one described above, does not detect the amount of light being transmitted to the observer. It merely detects which objective is in place. It cannot compensate for specimen variations which require changes in lighting.

Another illuminating system is shown and described in U.S. Pat. No. 3,833,282, issued Sept. 3, 1979, to G. Kappel et al. The illumination system set forth therein has a lens system whose focal length may be varied to suit the field of view of an objective. The variation in the lens is accomplished by response to a reference signal sent by, for instance, one of a plurality of photocells.

The apparatus described by Kappl et al is quite complicated, requiring a reversible drive motor and a clutch connected to a lead screw which in turn carries the variable lens system. Reference marks on the nosepiece are detected by the photocells which in turn pass on the information to an evaluator which supplies the information to a data converter which in turn generates a set point relative to the information received.

This system is quite costly resulting from the sophistication of parts used and from the complexity of construction details. The system further suffers from the drawback that the grooves formed in the nosepiece may become soiled or tarnished which would alter the signal received by the photocell and sent on to the converter. Further, the system does not detect the light available to the observer and adjust it to optimum. It merely detects the objective in place and adjusts the light relative to that objective. Therefore, the light produced by this system may not be what the observer actually needs to properly examine the specimen.

The invention, as set forth and described in detail hereinafter, overcomes the problems encountered by the devices described above, as well as others.

SUMMARY OF THE INVENTION

The present invention provides an automatic light control system for optical instruments having multiple objectives mounted to a rotating nosepiece. A light detecting element, such as a photocell, is mounted in or near the light path of the optical instrument so that it may detect the amount of light emitted by the illuminator which reaches the operator's eyes. The photocell produces an electrical signal which corresponds to the amount of light striking it. This signal is compared with a reference signal. Depending on the results of the comparison, the voltage to the illuminator will be adjusted to produce the amount of light which is required to properly illuminate the specimen relative to the power of the objective in place. A switching mechanism is incorporated to control the flow of current to the illuminator relative to the position of the rotatable carrier. When the carrier is rotated to change the power of the objective, the switching mechanism immediately interrupts the flow of current to the illuminator which thereby reduces and maintains the intensity of light at a minimum condition. By so doing, the photocell will not detect the darkening image caused by the rotation of the carrier. Therefore, the operator is not exposed to intense flashes of light.

DETAILED DESCRIPTION OF THE PREFERRED EMBODIMENT

Figure 1:
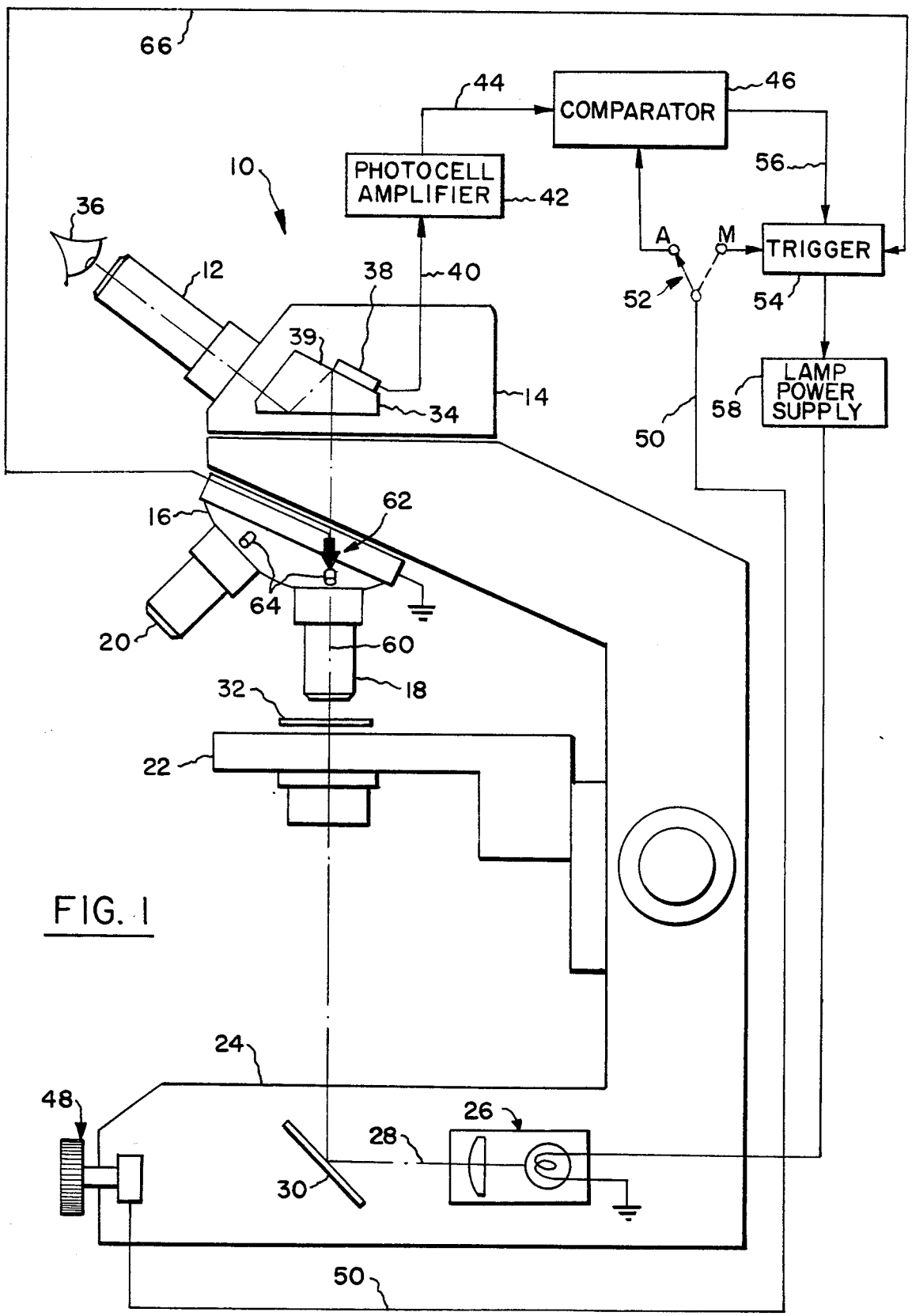
FIG. 1 is a schematic view of a multi-objective optical instrument, such as a microscope, including the automatic illumination control and switching apparatus.

An optical instrument 10, such as a microscope, generally comprises an eyepiece 12, head assembly 14, nosepiece 16, a plurality of objectives, such as is illustrated by 18 and 20, stage 22, base 24 and illuminator 26.

Light 28 produced by the illuminator 26 is reflected by mirror 30 through a specimen slide 32 supported by the stage 22 and to objective 18, as best seen in FIG. 1. Inclination prism 34 mounted in head 14 reflects the light 28 to the eyepiece 12 and to the observer 36.

A light sensitive element 38, such as a photocell, is mounted to surface 39 of the inclination prism 34 which has been mirror coated to allow approximately three percent light leakage. The photocell 38 (readily available from Vactec, Inc. Part No. VTS-3022, or equivalent) produces a voltage signal 40 which is proportional to the amount of light leaked through surface 39. However, the photocell signal 40 has such a low value, approximately 25-150 milli-volts, that it must be raised by amplifier 42 to approximately 1-1½ volts. The amplified signal 44 is transmitted to a comparator 46.

A rheostat 48, similar to those used on microscopes well known in the art, is conveniently mounted to base 24 and is operable to either increase or decrease the level of light produced by illuminator 26. The operator would, for instance, initially observe the first specimen slide 32 in the series to be viewed. Depending on the intensity of light observed through the first slide, the rheostat would be adjusted to provide the level of light most comfortable for the viewer. The adjustments to the rheostat in turn produce a reference signal 50 which is sent through switch 52 to either comparator 46 if in the "A" position or trigger mechanism 54, if in the "M" position, as best illustrated in FIG. 1. When the rheostat has been adjusted to regulate the intensity of light to the level most comfortable for the viewer, reference signal 50, will be constant and proportional to that level of light. If switch 52 is in the "A", or automatic, position, reference signal 50 is sent to comparator 46 where it is compared with signal 44. Comparator 46 produces a comparison signal 56 which is sent to trigger mechanism 54. The trigger mechanism 54 is essentially a switch which opens and closes on a time basis to control illuminator 26 through power supply transformer 58. Depending on the value of comparison signal 56 received from the comparator 46, trigger 54 will actuate to control the voltage available to the transformer 58. If, for instance, a fairly transparent specimen slide is replaced by a less transparent specimen slide, the light passing through the more opaque slide will be proportionally less intense. The photocell 38 detects the reduction of light and produces a correspondingly low voltage signal 40 which is then compared to the reference signal 50 preset by rheostat 48. The comparator 46 detects the difference and sends signal 56 to trigger 54 which compensates by timing the switching such that power supply transformer 58 transmits more voltage to illuminator 26. In this instance, the trigger 54 accomplishes this by staying in a closed position for a longer period of time, based on a sine wave function, than it would be in an open position. Conversely, if the value of comparison signal 56 had been high, trigger 54 would stay open longer, thereby allowing less current to flow to illuminator 26 resulting in less intense light. Operator 36 would then be able to observe the specimen with the same level of illumination previously selected without having to manually readjust rheostat 48.

Figure 2:
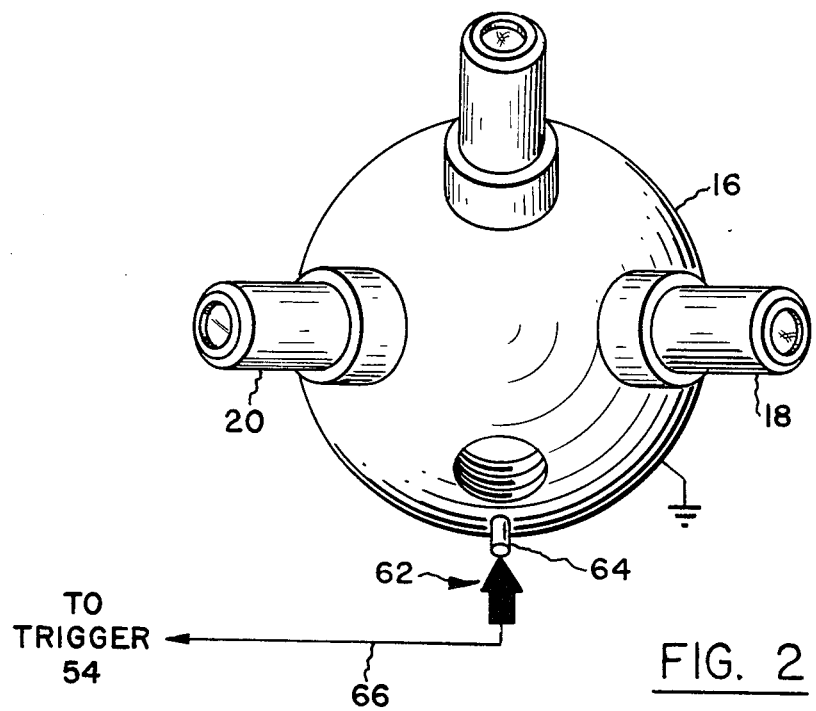
FIG. 2 is a schematic view of a rotatable multi-objective nosepiece, showing the switch in the "on" position.
Figure 3:
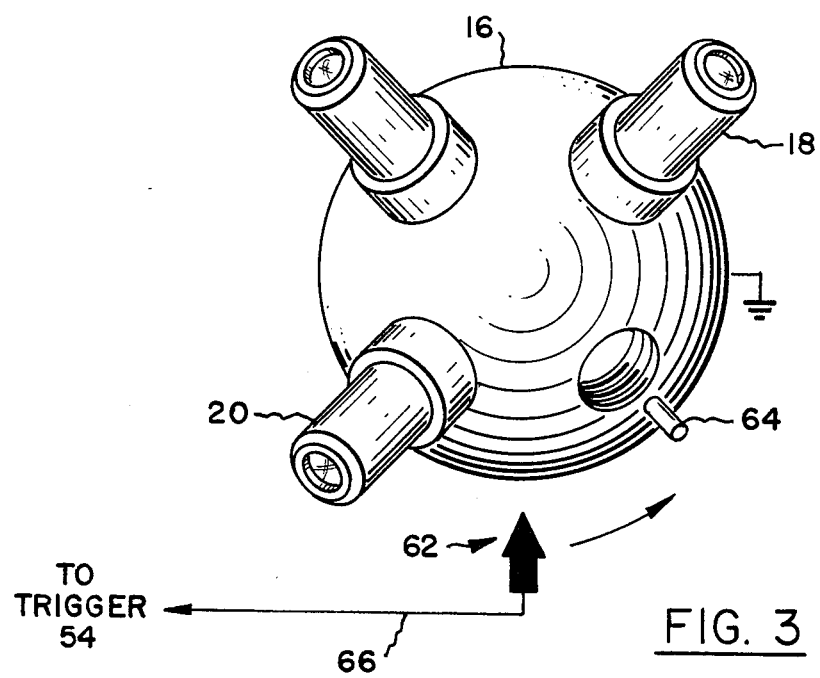
FIG. 3 is a view similar to FIG. 2 showing the nosepiece rotated and the switch in an "off" position.

The system described above works satisfactorily if a single objective is being used, but will also function most satisfactorily on a multi-objective instrument. However, a microscope having multi-objectives encounters a complication when the nosepiece is rotated to change the objective power. For instance, a 10× objective has a much larger aperture than does a 40× objective and, therefore, will pass much more light. To maintain the same light level at the reflector plane when the 10× objective is replaced by a 40× objective requires that the light be much more intense. The photocell 38, as provided in this system, will detect the change in light 28 and compensate automatically just the same as when slides are changed. However, it has been observed that when the nosepiece 16 is revolved to change from one objective to another, the photocell 38 initially detects a darkening as the objective is revolved out of the optical axis 60. The photocell 38 immediately reacts to the initial darkening by signalling the comparator 46 that a low-light situation exists. The comparator 46 in turn acts to have the trigger 50 control the illuminator voltage, as described above, such that light 28 is intensified. This happens so rapidly that before the objective is completely rotated out of the way, the light 28 is intensified significantly and the operator is exposed to a sudden burst of light, or "flashing" which can be quite annoying and uncomfortable. When there is no objective in place, or nearly in place, no light reaches the photocell and the automatic system will operate the lamp at maximum intensity. This will shorten lamp life, and produce maximum fluctuations of light level. In order to overcome this situation, a switching mechanism 62 responsive to the rotation of the nosepiece 16, as best seen in FIGS. 2 and 3, has been incorporated into the circuitry. The switching mechanism 62 includes a plurality of conductive members 64 which are positioned about nosepiece 16. As the nosepiece 16 is grounded, a circuit through trigger 50 by connection 66, such as is shown in FIG. 1, is completed and illuminator 26 is energized. However, as the nosepiece 16 is rotated, contact between the switching mechanism 62 and conductive member 64 is broken thereby opening the circuit and interrupting power to the illuminator 26.

It is well known that illuminator lamp life is severely effected by the number of times it is turned on and off completely. Therefore, appropriate circuitry, not forming part of this invention, has been included in trigger 54 which acts to automatically lower and maintain the intensity of the illuminator 26 at a minimum level as the nosepiece 16 is rotated.

It will be appreciated that switching mechanism 62 also controls light output when an objective is being rotated into position as well as when it is rotated out of position. That is, light 28 from illuminator 26 will be kept on low from the time one objective, such as 18, is rotated out of position, until a second objective, such as 20, is rotated into position. Once the second objective 20 is fully in position, contact between the switching mechanism 62 and conductive member 64 is made completing a circuit through trigger 54 to illuminator 26 which is then reactivated to its proper preselected light level.

The switch 52, as described earlier allows the system to function automatically when it is in the "A" position as indicated in FIG. 1. However, the operator may wish to operate the instrument on a manual basis which allows him complete and independent control of the lighting system. By setting switch 52 to the "M" position, the automatic portion of the circuitry is eliminated. The rheostat signal 50 would be switched directly through the trigger mechanism 54 and power supply transformer 58 to the illuminator 26. Therefore, every time an objective or slide was changed the operator would manually readjust the rheostat 48 to accomplish proper lighting.

In the multi-objective system described above, it is important that the photocell be mounted to the instrument so that it detects essentially the same level of light which reaches a receptor plane, such as an operator's eyes. Although the photocell is shown as being mounted adjacent the inclination prism, it could also have been mounted anywhere between the objective and the eyepiece and satisfactory results achieved.

Accordingly, it should be understood that the invention is not restricted to only the system shown and described. Modification to the system could be accomplished which would not depart from the spirit or scope of the invention as set forth in the following claims.

I claim:

1. In an optical instrument having an optical axis, a plurality of objectives selectively positionable along said optical axis, and means, including an illuminator, for producing a preselected light level at a receptor plane positioned along said axis, apparatus for automatically maintaining said preselected light level at said receptor plane, regardless of which of said objectives is positioned along said optical axis, said apparatus comprising:

a photocell mounted relative to said optical axis to detect at least a portion of said preselected light level at said receptor plane, said photocell producing a signal proportional to the amount of light detected, said signal changing in response to a change in said preselected light level;

monitoring means for receiving and comparing said photocell signal with a preselected reference signal and producing an output comparison signal, said comparison signal changing in response to a change in said photocell signal;

trigger means receiving said comparison signal and sending an output signal proportional thereto to said illuminator, said output signal changing in response to a change in said comparison signal to thereby change the output of said illuminator to thereby maintain a preselected light level at said receptor plane; and means responsive to a change from one objective to another, said means being electrically connected to said trigger means to overide and reduce the preselected light level to a further predetermined level of light when any objective is not aligned with said optical axis.

2. The apparatus as set forth in claim 1, wherein an inclination prism is positioned along said optical axis between said plurality of selectively positionable objectives and said receptor plane, one surface of which has a partially transmissive coating thereon.

3. The apparatus as set forth in claim 2, wherein said photocell for detecting at least a portion of said preselected light level is mounted adjacent said surface of said inclination prism which has said partially transmissive coating thereon.

4. The apparatus as set forth in claim 3, wherein said partially transmissive coating leaks approximately three percent of the light striking it.

5. The apparatus as set forth in claim 1, wherein said apparatus for automatically maintaining said preselected light level includes a rheostat for allowing the operator of said optical instrument to set the level of light produced by said illuminator to a level of comfort for said operator.

6. The apparatus as set forth in claim 1, wherein said means responsive to a change from one objective to another comprises a switch assembly which is closed when one of said selectively positionable objectives is aligned with the optical axis and open when one of said selectively positionable objectives are optically aligned.

7. The apparatus as set forth in claim 6, wherein said switch assembly includes a stationary contact and a plurality of conductive members mounted relative to said plurality of selectively positionable objectives.

* * * * *